(12) United States Patent
Magriso et al.

(10) Patent No.: US 12,381,906 B1
(45) Date of Patent: Aug. 5, 2025

(54) SYSTEM AND METHOD FOR PRIVATE REGISTRY CYBERSECURITY INSPECTION

(71) Applicant: Wiz, Inc., New York, NY (US)

(72) Inventors: Karin Magriso, Rishon Letzion (IL); Isaac Schnitzer, Tel Aviv (IL); Niv Roit Ben David, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/435,759

(22) Filed: Feb. 7, 2024

(51) Int. Cl.
*G06F 21/57* (2013.01)
*H04L 9/40* (2022.01)

(52) U.S. Cl.
CPC ...... *H04L 63/1441* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 8,458,789 B1 * | 6/2013 | Bartram | G06F 21/568 726/22 |
| 10,002,247 B2 | 6/2018 | Suarez et al. | |
| 11,789,723 B2 | 10/2023 | Suarez et al. | |
| 11,841,945 B1 * | 12/2023 | Fogel | G06F 21/53 |
| 2017/0177860 A1 * | 6/2017 | Suarez | G06F 21/53 |
| 2017/0187540 A1 * | 6/2017 | Stopel | H04L 63/1433 |
| 2018/0278639 A1 * | 9/2018 | Bernstein | G06F 21/53 |
| 2019/0020711 A1 * | 1/2019 | Alfieri | H04L 41/5051 |
| 2021/0173935 A1 * | 6/2021 | Ramasamy | G06F 21/577 |
| 2022/0318386 A1 * | 10/2022 | Bhosale | G06F 21/552 |
| 2022/0391215 A1 * | 12/2022 | Bregman | G06F 9/45558 |

* cited by examiner

*Primary Examiner* — Fatoumata Traore
(74) *Attorney, Agent, or Firm* — M&B IP Analysts, LLC

(57) ABSTRACT

A system and method for cybersecurity inspection of private software registries is presented. The method includes: deploying an inspection broker in a computing environment, the inspection broker configured to communicate with a private registry of the computing environment; configuring the inspection broker to access the private registry for a list of objects stored in the private registry; selecting an object from the private registry for cybersecurity inspection; inspecting the object for a cybersecurity object in the computing environment; generating an inspection result based on detection of the cybersecurity object; sending the inspection result to an inspection environment, the inspection environment including a representation of the computing environment; and initiating a mitigation action based on the inspection result, the mitigation action generated in response to an instruction from the inspection environment.

17 Claims, 3 Drawing Sheets ary of several example embodiments of the
SYSTEM AND METHOD FOR PRIVATE REGISTRY CYBERSECURITY INSPECTION

TECHNICAL FIELD

The present disclosure relates generally to cybersecurity inspection, and specifically for inspecting software images in private registries for cybersecurity issues.

BACKGROUND

Private image registries are repositories that store and manage container images in a secure and private environment. In the context of containerization technologies such as Docker®, an image registry is a centralized service for storing and distributing software container images. Container images contain the necessary software components and dependencies to run a specific application.

Public image registries, such as Docker Hub, are openly accessible to anyone. However, private image registries are designed for more restricted access, typically within an organization or for specific projects. These private registries provide a controlled and secure environment for storing proprietary or sensitive container images.

Popular private image registry solutions include Docker Registry (which can be configured to run as a private registry), Amazon® Elastic Container Registry (ECR), Google® Container Registry, and the like.

Using private image registries becomes crucial in scenarios where an organization needs to maintain control over its containerized applications, protect sensitive information, and comply with regulatory requirements.

However, such private image registries present a challenge to scan for threats, enforce policies, and the like, since they are often inaccessible by design to third party vendors providing such services.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include deploying an inspection broker in a computing environment, the inspection broker configured to communicate with a private registry of the computing environment. Method may also include configuring the inspection broker to access the private registry for a list of objects stored in the private registry. Method may furthermore include selecting an object from the private registry for cybersecurity inspection. Method may in addition include inspecting the object for a cybersecurity object in the computing environment. Method may moreover include generating an inspection result based on detection of the cybersecurity object. Method may also include sending the inspection result to an inspection environment, the inspection environment including a representation of the computing environment; and initiating a mitigation action based on the inspection result, the mitigation action generated in response to an instruction from the inspection environment. Other embodiments of this aspect include corresponding computer systems, apparatus, and computer programs recorded on one or more computer storage devices, each configured to perform the actions of the methods.

Implementations may include one or more of the following features. Method where initiating the mitigation action further comprises: initiating a remediation action based on the detected cybersecurity object. Method where the object is any one of: a software image, a code object, and a combination thereof. Method may include: configuring the inspection broker to provision an inspector, the inspector configured to inspect an object for a cybersecurity object. Method where initiating the mitigation action further comprises: initiating any one of: revoking a permission, revoking access to a resource, revoking access from a resource, quarantining a software image, quarantining a code object, generating an alert, generating a severity for an alert, updating an alert, updating a severity for an alert, and a combination thereof. Method may include: detecting a nested object in the object; and initiating inspection of the nested object for a cybersecurity object. Method where the cybersecurity object is any one of: a password, a file, a data file, a registry file, an application, an operating system, a certificate, a code object, a software image, a nested workload, a malware, a signature, a vulnerability, a misconfiguration, and a combination thereof. Method may include: generating a representation of the computing environment, the representation including a representation of: the object, and the cybersecurity object. Implementations of the described techniques may include hardware, a method or process, or a computer tangible medium.

In one general aspect, non-transitory computer-readable medium may include one or more instructions that, when executed by one or more processors of a device, cause the device to: deploy an inspection broker in a computing environment, the inspection broker configured to communicate with a private registry of the computing environment; configure the inspection broker to access the private registry for a list of objects stored in the private registry; select an object from the private registry for cybersecurity inspection; inspect the object for a cybersecurity object in the computing environment; generate an inspection result based on detection of the cybersecurity object; send the inspection result to an inspection environment, the inspection environment including a representation of the computing environment; and initiate a mitigation action based on the inspection result, the mitigation action generated in response to an instruction from the inspection environment. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: deploy an inspection broker in a computing environment, the inspection broker configured to communicate with a private registry of the computing environment. System may in addition configure the inspection broker to access the private registry for a list of objects stored in the private registry. System may moreover select an object from the private registry for cybersecurity inspection. System may also inspect the object for a cybersecurity object in the computing environment. System may furthermore generate an inspection result based on detection of the cybersecurity object. System may in addition send the inspection result to an inspection environment, the inspection environment including a representation of the computing environment. System may moreover initiate a mitigation action based on the inspection result, the mitigation action generated in response to an instruction from the inspection environment. Other embodiments of this aspect include corresponding computer systems, apparatus, and computer programs recorded on one or more computer storage devices, each configured to perform the actions of the methods.

Implementations may include one or more of the following features. System where the memory contains further instructions that, when executed by the processing circuitry for initiating the mitigation action, further configure the system to: initiate a remediation action based on the detected cybersecurity object. System where the object is any one of: a software image, a code object, and a combination thereof. System where the memory contains further instructions which when executed by the processing circuitry further configure the system to: configure the inspection broker to provision an inspector, the inspector configured to inspect an object for a cybersecurity object. System where the memory contains further instructions that, when executed by the processing circuitry for initiating the mitigation action, further configure the system to: initiate any one of: revoke a permission, revoking access to a resource, revoking access from a resource, quarantining a software image, quarantining a code object, generating an alert, generating a severity for an alert, updating an alert, updating a severity for an alert, and a combination thereof. System where the memory contains further instructions which when executed by the processing circuitry further configure the system to: detect a nested object in the object; and initiate inspection of the nested object for a cybersecurity object. System where the cybersecurity object is any one of: a password, a file, a data file, a registry file, an application, an operating system, a certificate, a code object, a software image, a nested workload, a malware, a signature, a vulnerability, a misconfiguration, and a combination thereof. System where the memory contains further instructions which when executed by the processing circuitry further configure the system to: generate a representation of the computing environment, the representation including a representation of: the object, and the cybersecurity object. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
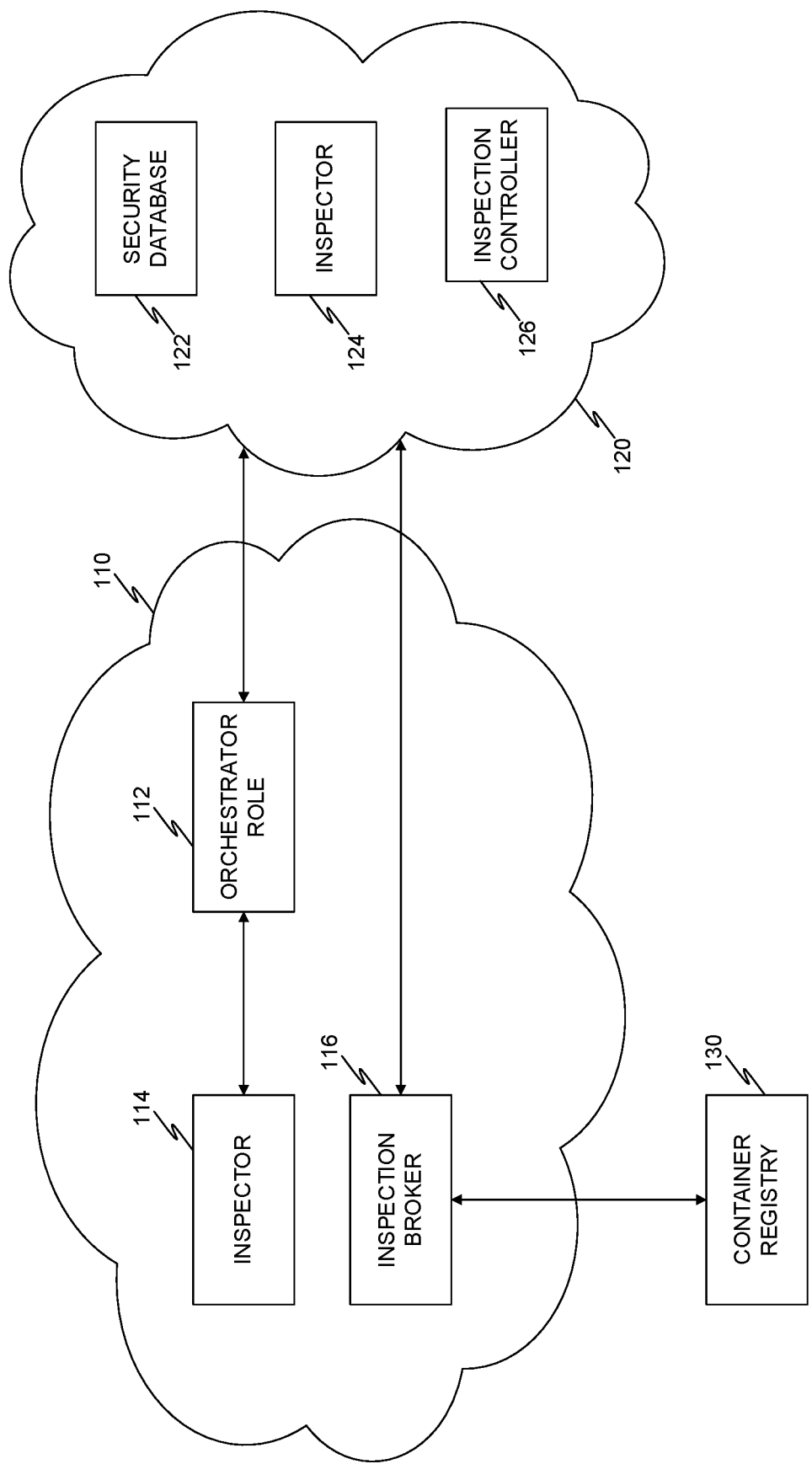
FIG. 1 is an example of a computing environment having a private registry monitored by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example of a computing environment having a private registry monitored by an inspection environment, implemented in accordance with an embodiment. In an embodiment, a computing environment 110 is connected to a container registry 130. In some embodiments, the computing environment 110 is a cloud computing environment, a hybrid computing environment, an on-prem environment, a combination thereof, and the like.

In some embodiments, the computing environment 110 includes a virtual private cloud (VPC), a virtual network (VNet), and the like. In certain embodiments, the computing environment 110 is deployed on a cloud computing infrastructure, such as Amazon® Web Services (AWS), Google® Cloud Platform (GCP), Microsoft® Azure, and the like.

According to an embodiment, the computing environment 110 is connected to the container registry 130, which is configured to store software images therein. In some embodiments, the computing environment 110 is connected to other registries, such as a code registries, for example Github®.

In an embodiment, the computing environment 110 further includes resources, principals, and the like, not shown here for simplicity. A resource is, according to an embodiment, a hardware resource, a virtual resource, and the like. For example, in an embodiment, a resource is a virtual machine, a software container, a serverless function, a combination thereof, and the like.

In certain embodiments, a resource is an application, an operating system, a software library, a software binary, various combinations thereof, and the like. In some embodiments, a principal is an entity in a computing environment which is authorized to initiate actions in the computing environment. For example, in an embodiment, a principal is a user account, a service account, a local account, a network account, a user group, a user role, a combination thereof, and the like.

In an embodiment, a computing environment 110 is configured to deploy an inspector 114, an inspection broker 116, a combination thereof, and the like. In certain embodiments, the inspector 114, the inspection broker 116, and the like, are deployed in a virtual private cloud in the computing environment 110.

In some embodiments, the inspector 114 is configured to inspect a workload, a software image, a disk, and the like, for a cybersecurity object. According to an embodiment, a cybersecurity object is a password, a file, a data file, a registry file, an application, an operating system, a certificate, a code object, a software image, a nested workload (e.g., a software container deployed in a virtual machine), a combination thereof, and the like.

In certain embodiments, an inspection broker 116 is configured to access a container registry 130 and retrieve therefrom a list of image stored on the container registry. In an embodiment, the inspection broker 116 is configured to access various registries, repositories, and the like, which are configured to store software objects, code objects, software images, and the like. In an embodiment, a software image is utilized to deploy a virtual machine, a software container, serverless function, and the like virtualizations.

In some embodiments, a software image contains multiple layers, and an inspector 114 is configured to inspect at least a layer of a plurality of layers for a cybersecurity object.

According to an embodiment, an inspection controller 126 is deployed in an inspection environment 120, and is configured to receive a list of software images from an inspection broker 116. In an embodiment, the inspection controller 126 is configured to select a software image for inspection. For example, in an embodiment, the inspection controller 126 selects a software image for inspection based on a timestamp (e.g., inspect a software image every 24 hours), based on a deployment (e.g., detecting that the software image is utilized in deployment of a virtual instance in the computing environment 110), a combination thereof, and the like.

In an embodiment, the inspection environment 120 is configured to assume an orchestrator role 112 in the computing environment 110. In some embodiments, the orchestrator role 112 is configured to deploy, provision, etc., inspector workloads, such as inspector 114, inspection brokers, such as inspection broker 116, and the like.

In some embodiments, an inspection controller 126 is configured to initiate inspection of a software image by assuming the orchestrator role 112 and configuring a workload, such as the inspection broker 116, an inspector 114, and the like, to pull a software image from the container registry 130.

In some embodiments, the inspector 114 is provided access to the software image pulled from the container registry 130 for inspection. In an embodiment, the inspector 114 is configured to generate an inspection result. According to an embodiment, an inspection result includes metadata, for example indicating what cybersecurity object(s) was found on the software image. In certain embodiments, the inspector 114, inspection broker 116, and the like, are implemented in a virtual private cloud (VPC) in the computing environment 110. In some embodiments, a workload, virtual instance, and the like, in the VPC is configured to send the inspection result to the inspection environment 120.

According to an embodiment, the inspection result is utilized in generating a representation of the software image which is stored in a security database 122. In an embodiment, the security database 122 includes a representation of the computing environment 110. For example, in an embodiment, the security database 122 is a graph database (e.g., Neo4j®) and is configured to store representations of resources, principals, enrichments, remediation actions, application endpoints, network objects, code objects, malware objects, vulnerabilities, exposures, misconfigurations, and the like, as nodes in a security graph.

For example, in an embodiment, an inspector 114 is configured to inspect a software image from a container registry 130. The inspector 114 is configured to generate an inspection result, which includes detection of a Windows® operating system, a SSH certificate, and a local user account. In an embodiment, the inspection result is sent to the inspection environment 120, where the security database 122 is configured to generate a representation of the Windows OS, the SSH certificate, the local user account, and the software image on which all the above was detected. In an embodiment, each is represented by a node in a security graph, where the OS node, the certificate node, and the user account node are each connected to a node representing the software image.

This is advantageous, in an embodiment, as it allows the inspection environment 120 to inspect software images in the container registry 130, where the container registry is a private registry which is connected only to the computing environment 110. This is especially advantageous where the container registry 130 is not connected to the internet, or other publicly available network, through which the inspection environment 120 might have otherwise been able to connect to.

Figure 2:
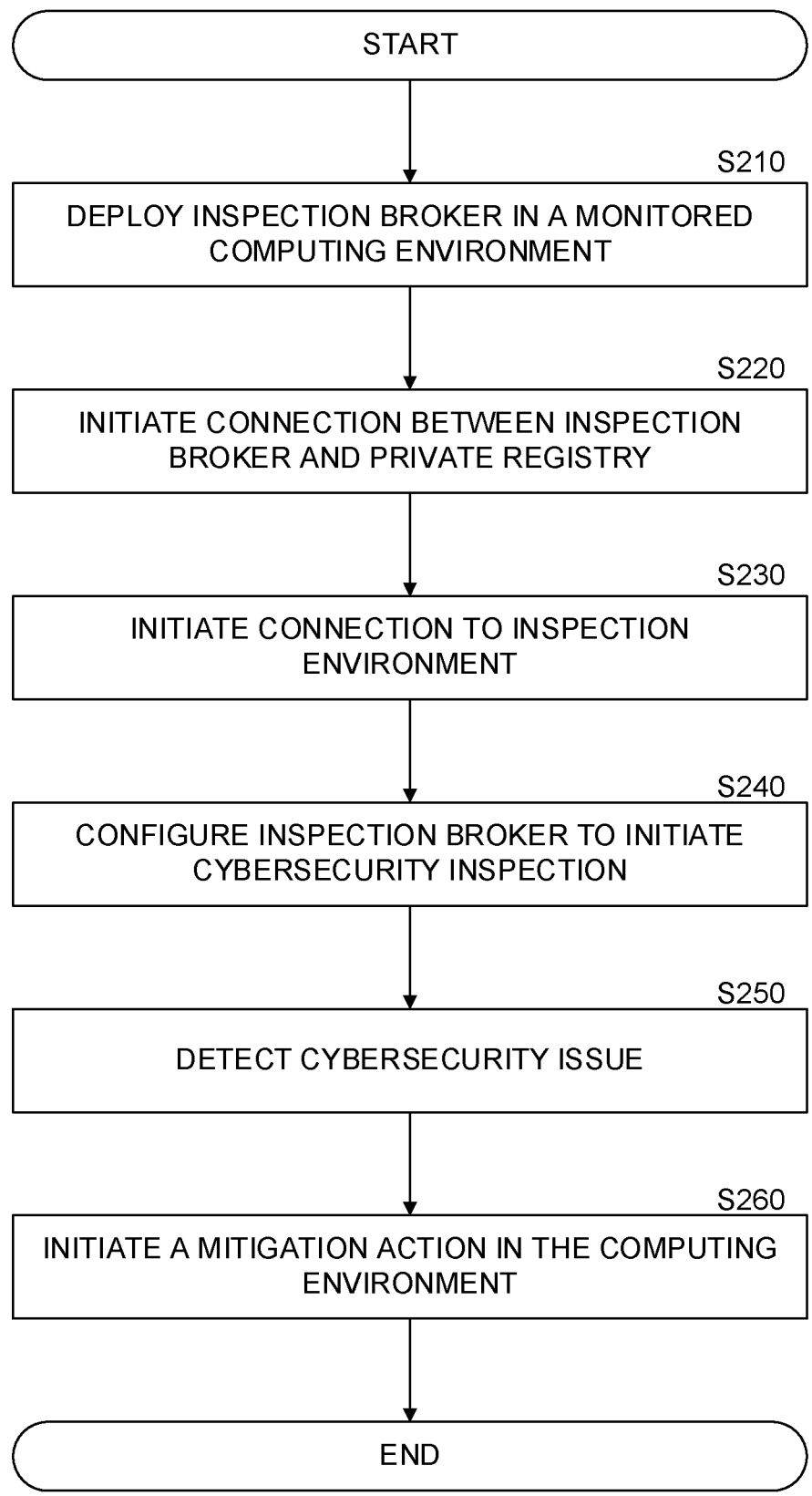
FIG. 2 is an example flowchart of a method for inspecting a software image in a private registry, implemented in accordance with an embodiment.

FIG. 2 is an example flowchart of a method for inspecting a software image in a private registry, implemented in accordance with an embodiment.

At S210, an inspection broker is deployed. In an embodiment, the inspection broker is deployed in a computing environment which is monitored for cybersecurity issues by an inspection environment. For example, in an embodiment, a cybersecurity issue is a cybersecurity threat, a vulnerability, a misconfiguration, an exposure, a combination thereof, and the like.

In some embodiments, a cybersecurity issue is indicated by detection of a cybersecurity object, as discussed in more detail throughout. According to certain embodiments, a cybersecurity issue is detected based on detecting multiple cybersecurity objects, a combination of a cybersecurity object and an exposure, and the like. In an embodiment, this is also referred to as a toxic combination.

At S220, a connection is initiated between the inspection broker and a private registry. In an embodiment, the private registry includes a container registry, a software repository, an image repository, a code repository, a combination thereof, and the like.

In certain embodiments, the private registry is configured to communicate only with the computing environment. For example, in an embodiment, the private registry is configured to block communication from a public network, such as the Internet.

In some embodiments, the inspection broker is deployed in a virtual private cloud (VPC) of the computing environment. In an embodiment, this is advantageous to isolate the inspection broker from the rest of the computing environment.

In certain embodiments, the inspection broker is configured to receive a list of software images, code objects, software binaries, software libraries, etc., which are stored on the private registry. In an embodiment, the inspection broker is configured to send the list to an inspection controller, for example in an inspection environment, which is configured to select a resource for inspection based on the list of identifiers.

At S230, a connection is initiated to an inspection environment. In an embodiment, the inspection environment includes an inspection controller. In some embodiments, the inspection controller is configured to initiate inspection of software images, workloads, resources, virtual disks, various combinations thereof, and the like. In certain embodiments, the inspection broker, the inspector, and the like, are deployed in a VPC in the computing environment, wherein the VPC is connected to the inspection environment, for example by a peering connection, a PrivateLink, and the like.

In some embodiments, the inspection broker is configured to initiate communication with a component of the inspection environment, such as the inspection controller. In an embodiment, the inspection broker is configured to initiate communication via a predetermined network path, including, for example, an IP address, a domain name, a port number, a username, a password, a certificate, a combination thereof, and the like.

At S240, cybersecurity inspection is initiated. In an embodiment, the inspection broker is configured to initiate cybersecurity inspection. In some embodiments, an inspection controller deployed in an inspection environment is configured to initiate cybersecurity inspection, for example by configuring an inspection broker to provision an inspector in the computing environment.

In some embodiments, the inspection broker is configured to access the private registry and retrieve therefrom a software image, a code object, a combination thereof, and the like. In an embodiment, the inspection broker is configured to provide access to the extracted software image, code object, etc. to an inspector, wherein the inspector is deployed in the computing environment.

In certain embodiments, the inspection broker is configured to deploy, provision, and the like, an inspector, wherein the inspector is configured to inspect for a cybersecurity object.

In some embodiments, a cybersecurity object is a password, a file, a data file, a registry file, an application, an operating system, a certificate, a code object, a software image, a nested workload (e.g., a software container deployed in a virtual machine), a malware, a signature, a vulnerability, a misconfiguration, a combination thereof, and the like.

In an embodiment, the software image, code object, and the like, is deleted from the computing environment once inspection is complete. In an embodiment, an inspector is configured to generate an inspection result. In some embodiments, an inspection result includes metadata, data, and the like, which was detected based on inspection of the software image, code object, etc. For example, in an embodiment, a result includes identifiers of each cybersecurity object detected in a software image.

In some embodiments, the inspection result is utilized in generating a representation of the computing environment, for example in a security graph stored in a database in the inspection environment.

At S250, a cybersecurity issue is detected. In an embodiment, the cybersecurity issue is detected based on detecting a cybersecurity object. For example, in an embodiment, a database is detected on a software image. In the embodiment, the database includes a misconfiguration, such that the database is not password protected. According to an embodiment, an unprotected database is a cybersecurity issue.

In some embodiments, the cybersecurity issue is associated with a severity. In an embodiment, the severity includes a score, such as a qualitative score, a quantitative score, a combination thereof, and the like.

In certain embodiments, a representation of the cybersecurity issue is stored in the security database. In an embodiment, the representation of the cybersecurity issue is connected to a representation of the software image on which the cybersecurity issue is detected.

At S260, a mitigation action is initiated. In an embodiment, the mitigation action includes a remediation action. In some embodiments, the remediation action includes a remediation script, selected from a plurality of remediation scripts. In certain embodiments, the remediation script is selected based on the detected cybersecurity issue.

In some embodiments, the mitigation action includes revoking a permission, revoking access to a resource, revoking access from a resource, quarantining a software image, quarantining a code object, generating an alert, generating a severity for an alert, updating an alert, updating a severity for an alert, a combination thereof, and the like.

In an embodiment, the mitigation action includes initiating an inspection. For example, in some embodiments, a nested workload (e.g., a nested virtual machine, software container, serverless function, etc.) is detected from a cybersecurity inspection of a software image. In some embodiments, the mitigation action includes initiating inspection of the nested workload.

Figure 3:
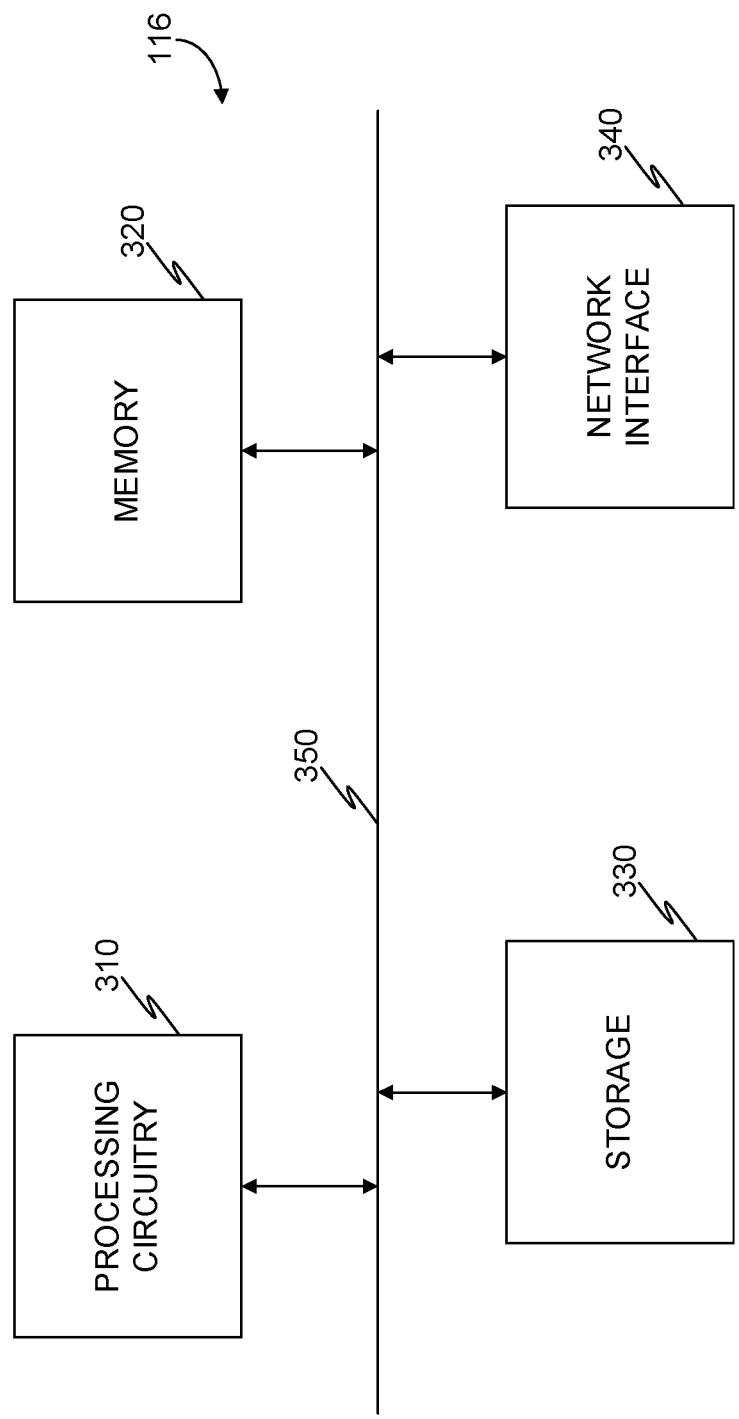
FIG. 3 is an example schematic diagram of an inspection broker according to an embodiment.

FIG. 3 is an example schematic diagram of an inspection broker 116 according to an embodiment. The inspection broker 116 includes, according to an embodiment, a processing circuitry 310 coupled to a memory 320, a storage 330, and a network interface 340. In an embodiment, the components of the inspection broker 116 are communicatively connected via a bus 350.

In certain embodiments, the processing circuitry 310 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 320 is a volatile memory (e.g., random access memory, etc.), a non-volatile memory (e.g., read only memory, flash memory, etc.), a combination thereof, and the like. In some embodiments, the memory 320 is an on-chip memory, an off-chip memory, a combination thereof, and the like. In certain embodiments, the memory 320 is a scratch-pad memory for the processing circuitry 310.

In one configuration, software for implementing one or more embodiments disclosed herein is stored in the storage 330, in the memory 320, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 310, cause the processing circuitry 310 to perform the various processes described herein, in accordance with an embodiment.

In some embodiments, the storage 330 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 340 is configured to provide the inspection broker 116 with communication with, for example, the inspector 114, the inspection environment 120, and the like, according to an embodiment.

It should be understood that the embodiments described herein are not limited to the specific architecture illustrated in FIG. 3, and other architectures may be equally used without departing from the scope of the disclosed embodiments.

Furthermore, in certain embodiments the inspector 114, the inspector 124, the inspection controller 126, the container registry 130, and the like, may be implemented with the architecture illustrated in FIG. 3. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for cybersecurity inspection of private software registries, comprising:
    deploying an inspection broker in a computing environment, the inspection broker configured to communicate with: a private registry of the computing environment, and an inspection environment;
    configuring the inspection broker to access, through the computing environment, the private registry for a list of objects stored in the private registry;
    selecting an object from the private registry for cybersecurity inspection, wherein the private registry is configured to communicate only with the computing environment;
    inspecting the object for a cybersecurity object in the computing environment;
    generating an inspection result based on detection of the cybersecurity object;
    sending the inspection result to the inspection environment, the inspection environment including a representation of the computing environment; and
    initiating a mitigation action based on the inspection result, the mitigation action generated in response to an instruction from the inspection environment.

2. The method of claim 1, wherein initiating the mitigation action further comprises:
    initiating a remediation action based on the detected cybersecurity object.

3. The method of claim 1, wherein the object is any one of: a software image, a code object, and a combination thereof.

4. The method of claim 1, further comprising:
    configuring the inspection broker to provision an inspector, the inspector configured to inspect an object for a cybersecurity object.

5. The method of claim 1, wherein initiating the mitigation action further comprises:
    initiating any one of: revoking a permission, revoking access to a resource, revoking access from a resource, quarantining a software image, quarantining a code object, generating an alert, generating a severity for an alert, updating an alert, updating a severity for an alert, and a combination thereof.

6. The method of claim 1, further comprising:
    detecting a nested object in the object; and
    initiating inspection of the nested object for a cybersecurity object.

7. The method of claim 1, wherein the cybersecurity object is any one of: a password, a file, a data file, a registry file, an application, an operating system, a certificate, a code object, a software image, a nested workload, a malware, a signature, a vulnerability, a misconfiguration, and a combination thereof.

8. The method of claim 1, further comprising:
    generating a representation of the computing environment, the representation including a representation of: the object, and the cybersecurity object.

9. A non-transitory computer-readable medium storing a set of instructions for cybersecurity inspection of private software registries, the set of instructions comprising:
    one or more instructions that, when executed by one or more processors of a device, cause the device to:

deploy an inspection broker in a computing environment, the inspection broker configured to communicate with: a private registry of the computing environment, and an inspection environment;

configure the inspection broker to access, through the computing environment, the private registry for a list of objects stored in the private registry;

select an object from the private registry for cybersecurity inspection, wherein the private registry is configured to communicate only with the computing environment;

inspect the object for a cybersecurity object in the computing environment;

generate an inspection result based on detection of the cybersecurity object;

send the inspection result to the inspection environment, the inspection environment including a representation of the computing environment; and initiate a mitigation action based on the inspection result, the mitigation action generated in response to an instruction from the inspection environment.

10. A system for cybersecurity inspection of private software registries comprising:

a processing circuitry;

a memory, the memory containing instructions that, when executed by the processing circuitry, configure the system to:

deploy an inspection broker in a computing environment, the inspection broker configured to communicate with: a private registry of the computing environment, and an inspection environment;

configure the inspection broker to access, through the computing environment, the private registry for a list of objects stored in the private registry;

select an object from the private registry for cybersecurity inspection, wherein the private registry is configured to communicate only with the computing environment;

inspect the object for a cybersecurity object in the computing environment;

generate an inspection result based on detection of the cybersecurity object;

send the inspection result to the inspection environment, the inspection environment including a representation of the computing environment; and initiate a mitigation action based on the inspection result, the mitigation action generated in response to an instruction from the inspection environment.

11. The system of claim 10, wherein the memory contains further instructions that, when executed by the processing circuitry for initiating the mitigation action, further configure the system to:

initiate a remediation action based on the detected cybersecurity object.

12. The system of claim 10, wherein the object is any one of: a software image, a code object, and a combination thereof.

13. The system of claim 10, wherein the memory contains further instructions which when executed by the processing circuitry further configure the system to:

configure the inspection broker to provision an inspector, the inspector configured to inspect an object for a cybersecurity object.

14. The system of claim 10, wherein the memory contains further instructions that, when executed by the processing circuitry for initiating the mitigation action, further configure the system to:

initiate any one of:

revoke a permission, revoking access to a resource, revoking access from a resource, quarantining a software image, quarantining a code object, generating an alert, generating a severity for an alert, updating an alert, updating a severity for an alert, and a combination thereof.

15. The system of claim 10, wherein the memory contains further instructions which when executed by the processing circuitry further configure the system to:

detect a nested object in the object; and initiate inspection of the nested object for a cybersecurity object.

16. The system of claim 10, wherein the cybersecurity object is any one of:

a password, a file, a data file, a registry file, an application, an operating system, a certificate, a code object, a software image, a nested workload, a malware, a signature, a vulnerability, a misconfiguration, and a combination thereof.

17. The system of claim 10, wherein the memory contains further instructions which when executed by the processing circuitry further configure the system to:

generate a representation of the computing environment, the representation including a representation of:

the object, and the cybersecurity object.

* * * * *